United States Patent [19]

Shensa et al.

[11] 4,375,692

[45] Mar. 1, 1983

[54] LEAST SQUARES LATTICE DECISION FEEDBACK EQUALIZER

[75] Inventors: Mark J. Shensa, San Diego; Edgar H. Satorius, Long Beach; James D. Pack, San Diego, all of Calif.

[73] Assignee: The United States of America as represented by the Secretary of the Navy, Washington, D.C.

[21] Appl. No.: 259,130

[22] Filed: Apr. 30, 1981

[51] Int. Cl.³ ............................................ H04L 25/03
[52] U.S. Cl. ...................................... 375/13; 333/18; 364/553; 375/14
[58] Field of Search ................................... 375/13–16; 333/18; 364/553, 574, 724, 827

[56] References Cited

U.S. PATENT DOCUMENTS

| | | | |
|---|---|---|---|
| 3,500,000 | 3/1970 | Kelly, Jr. et al. | 179/170.2 |
| 3,836,734 | 9/1974 | Campanella et al. | 179/170.2 |
| 4,072,830 | 2/1978 | Gitlin et al. | 179/170.2 |
| 4,129,753 | 12/1978 | Duttweiler | 179/170.2 |
| 4,141,072 | 2/1979 | Perreault | 364/553 |
| 4,144,417 | 3/1979 | Oshima et al. | 179/170.2 |
| 4,253,184 | 2/1981 | Gitlin et al. | 333/18 |
| 4,328,585 | 5/1982 | Monsen | 375/14 |

*Primary Examiner*—Benedict V. Safourek
*Attorney, Agent, or Firm*—Robert F. Beers; Ervin F. Johnston; Thomas Glenn Keough

[57] ABSTRACT

An improved equalizer receives the output of a data transmission channel at the first stage of a number of successively coupled lattice stages which are each made up of a selected configuration of adjustable electrical components. A subtractor device is coupled to the lattice stages for providing a succession of error terms. The error terms are an accumulation of the squares of a number of error quantities, which are the differences between a sequence of undistorted training signals or estimates of the transmitted signal which are received by the subtractor device, and the same training signals after they have travelled through the data transmission channel. A delayed stage and two dimensional vector matrices are coupled in each of the lattice stages for iteratively adjusting their components in accordance with a least squares procedure, that is, the components are adjusted each time a signal is received and the iterative adjustment continues until a prespecified error limit is reached.

9 Claims, 7 Drawing Figures $D = (D_{11} \ D_{12})$ $c = \text{SCALAR}$    $c = D_{11}b_1 + D_{12}b_2$ $b = \begin{pmatrix} b_1 \\ b_2 \end{pmatrix}$    $E = \begin{pmatrix} E_{11} & E_{12} \\ E_{21} & E_{22} \end{pmatrix}$ $d = \begin{pmatrix} d_1 \\ d_2 \end{pmatrix}$    WHERE $d_1 = E_{11}b_1 + E_{12}b_2$ $d_2 = E_{21}b_1 + E_{22}b_2$ $b = \begin{matrix} b_1 \\ b_2 \end{matrix}$    $F = \begin{pmatrix} F_{11} & F_{12} \\ F_{21} & F_{22} \end{pmatrix}$ $d = \begin{pmatrix} d_1 \\ d_2 \end{pmatrix}$    WHERE $d_1 = F_{11}b_1 + F_{12}b_2$ $d_2 = F_{21}b_1 + F_{22}b_2$

LEAST SQUARES LATTICE DECISION FEEDBACK EQUALIZER

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED APPLICATION

This application is related to U.S. Patent and Trademark Office patent application Ser. No. 235,213 entitled "Least Squares Adaptive Lattice Equalizer" by Edgar H. Satorius, James D. Pack and Mark J. Shensa.

BACKGROUND OF THE INVENTION

The invention disclosed and claimed herein pertains generally to the field of equalizers or equalization apparatuses located at the receiving end of a data transmission channel which provides an inverse model thereof. More particularly, the invention pertains to equalizer apparatuses having a very rapid convergence time, i.e., which is capable of being set up as an inverse model of a data transmission channel in a very short time period. Even more particularly, the invention pertains to equalizer apparatuses for employment with data transmission channels which are subject to fading and related frequent or continual changes in channel characteristics.

As is well known in the art, an equalizer may be considered as a type of filter capable of providing a desired output in response to a specified input. The input to an equalizer usually is data which has been distorted by its passage through a data transmission channel and the desired equalizer output is the data in its original, undistorted form. Equalizer devices, which evolved in the mid-1960's, provided inverse models of data transmission channels and were usually located at the receiving ends. When channel distorted data was coupled into an equalizer, it was inversely distorted so that the equalizer output comprises the data in undistorted condition.

In order to set up, or "train," an equalizer as an inverse transmission channel model, a sequence of prespecified training signals were coupled directly to the equalizer, so that they were received without distortion. By determining the error between the undistorted and channel distorted (i.e. transmitted) forms of successive training signals and by adjusting the equalizer in relation to such errors, the equalizer was adapted to become an inverse channel model by the time the training signal sequence concludes.

Later equalizer designs generally are assemblies of adjustable electrical components coupled to appropriate means for varying respective parameters of the components in accordance with successive training signal errors. Such means include calculation or like devices for performing a series of mathematical computations in response to each training signal error. From the equalizers discussed, it will be readily apparent that their efficiency is closely related to the length of the training signal sequence which is required to set the equalizer up, and also to the number and complexity of the mathematical computations which are required per training signal error.

Cost and complexity of fabrication may make one design more attractive than another; however, a far more important consideration is operational efficiency. Efficiency of operation is directly related to an equalizer's convergence time, (the time required to adapt an equalizer to inversely model the characteristics of a particular data transmission channel). Convergence time is especially important when the data transmission channel is subjected to continual internal and external variations in channel characteristics, and when data is to be transmitted at very high rates of speed. If an equalizer is incapable of rapidly adapting or converging to the new channel characteristics, significant amounts of transmitted data may be lost.

The invention cross-referenced above provides a significant advance in the state-of-the-art in terms of both the convergence time and an equalizer's operational efficiency. The referenced apparatus has particular utility in the operation of a communication system wherein data is transmitted at a rapid rate through a channel which is subject to frequent or continual fading. Unfortunately, the equalizer is designed as an all zero equalizer and does not have a pole-zero capability.

SUMMARY OF THE INVENTION

The present invention is directed to providing an improved equalizer apparatus including a number of successively coupled lattice stages, the first of which receives the output of a data transmission channel. The apparatus further includes a means for coupling a given one $a(n)$ of discrete training signals in a sequence of discrete training signals to a first succession of error generating means. A second mode of operation is entered via selector switch 22 of FIG. 1 after the initial adaptation to the data channel. In this "decision" mode the output of the equalizer is thresholded to determine the original signal and this estimated signal is used in place of the training signal to monitor any further changes in the channel. To simplify the discussion hereafter, the phrase "training signal" or "$a(n)$" will be taken to include the thresholded version $\hat{y}(n)$ of FIG. 1. The training signals $a(n)$ are coupled to the first error generating means and their delayed version $a(n-1)$ are coupled to the first lattice stage at the same time that they are coupled to the first lattice stage through the data transmission channel. Each of the error generating means has a first and a second input, and functioning as means for generating an error quantity which represents the difference between its first and second inputs. The first input to a given one of the error generating means is an output of one of the lattice stages, and the second input is the error quantity which is generated by the error generating means which immediately precedes the given error generating means in the aforementioned succession. A separate component adjust means is coupled to respective components of the lattice stages to receive each of the error quantities for adjusting respective components. Adjustments are made by the component adjust means according to a least square procedure so that the error quantity of a specified error generating means is less than the error quantity of any error generating means which precedes the specified error generating means in the aforementioned succession. The apparatus also includes a summation means for providing the sum of all of the lattice stage outputs that are also fed as second stage inputs to the error generating means, such sum comprising the output $Y(n)$ of the equalizer apparatus. Switching means are provided for coupling the equalizer apparatus output $Y(n)$ to the first error generating means in the aforementioned succession, as a second input thereto, at the conclusion of the sequence of training signals. The component adjust means has a number of component adjust elements, each coupled to the components of one of the lattice stages for iteratively adjusting respective components of the particular lattice stage to iteratively reduce the error quantity of a particular error generating means, the particular error generating means receiving its first input from the preceding lattice stage. Each of the component adjust elements includes means for storing prespecified initial conditions in digital form, and means for processing and storing digital-form error quantities and digital-form lattice stage outputs. The iterative adjustments also are made as a function of the error quantity signals provided by the preceding error generating means.

OBJECTS OF THE INVENTION

An object of the present invention is to significantly reduce the convergence time and to improve the performance efficiency of an equalizer.

Another object is to provide an equalizer apparatus which adapts to transmission channel fading round off, and additive noise.

Yet another object is to provide an equalizer for use with a fast data rate communication channel being capable of rapidly adapting to changes in channel characteristics to prevent loss of transmitted data.

Still another object is to provide an uncomplicated equalizer having a number of cascade coupled lattice stages capable of fabrication as a series of discrete integrated circuit chips to create a multi-order equalizer.

Yet a further object is to provide a capability for an operational pole-zero equalizer.

Still a further object is to provide an auto regressive moving average model of a data transmission channel.

These and other objects, advantages and novel features of the invention will become apparent from the following detailed description of the invention when considered in conjunction with the accompanying drawings.

DESCRIPTION OF THE PREFERRED EMBODIMENT

Figure 1:
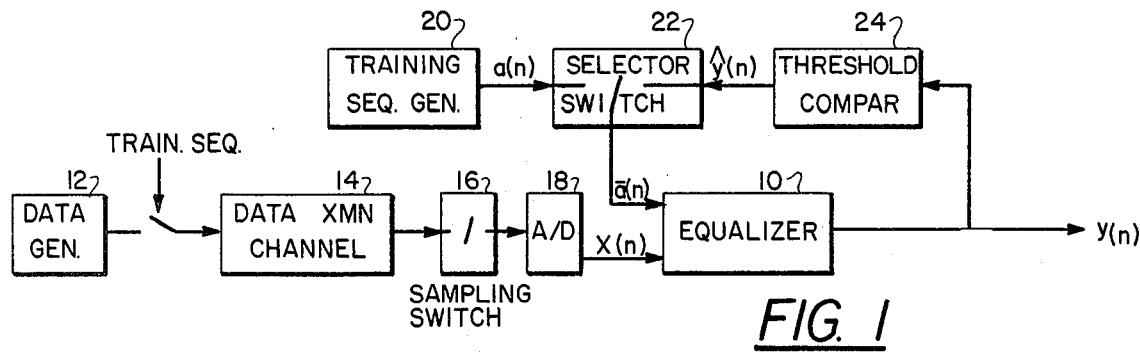
FIG. 1 is a schematic view of a data transmission system suited for inclusion of the improved equalizer.

Referring to FIG. 1, a communication system employs an equalizer 10 that embodies the novel features of this inventive concept. The communication system also has a data generator 12 for providing data in either analog or digital form, and a data transmission channel 14 for conveying the data from a first location to a second location. The data generator may be a pulse amplitude modulation (PAM) transmitter, which provides a sequence of signals having amplitudes selected from a range of discrete amplitude levels and the data transmission channel can be a microwave transmission channel which is subject to a continual fading or related change in channel characteristics. The reference to microwave transmission channels and pulse amplitude modulation is by no means intended to limit either the scope or the use of the invention. To the contrary, it is anticipated that the equalizer apparatus of the invention is adaptable for employment with most other conventional data transmission paths or modulation techniques.

Looking once more to FIG. 1, a sampling switch 16 receives the output of data transmission channel 14 which is not only the data originally provided by generator 12 but also the distortions of that data by the transmission channel. The sampling switch provides a series of samples of the transmission channel output and couples them to an analog-to-digital (A/D) converter 18. The output of the A/D converter is a digital number sequence of data samples $X(n)$, where n is the nth sample, and $X(n)$ is the output of the transmission channel, at the time that the nth sample is taken. The channel output sample $X(n)$ is fed to the input to equalizer 10.

In order to initially converge equalizer 10 to an inverse model of the transmission channel, a training sequence generator 20 is provided which generates a sequence of training signals $a(n)$. Each training signal is, for example, the digital or binary representation of one of the discrete amplitude levels which may occur in a PAM transmission system. A switch 22 selectively couples the training signal sequence directly to equalizer 10 as an input $\bar{a}(n)$.

The training sequence also is coupled through transmission channel 14 to equalizer input $X(n)$ during training. The timing of training signals coupled to inputs $\bar{a}(n)$ and $X(n)$ is such that a particular signal arrives in an undistorted form at the $\bar{a}(n)$ input at the same time that it arrives at the $X(n)$ input after being distorted by the channel. The $\bar{a}(n)$ input also is delayed $\bar{a}(n-1)$ in equalizer 10 and fed to the same input as $X(n)$. Various techniques for the synchronous generation and transmission of a training signal so that the equalizer simultaneously receives the undistorted and channel distorted forms are well known in the communication arts and are not needlessly described in detail. In one such technique, a transmission of data through channel 14 is preceded by a synchronizing indicator followed by the sequence of training signals. The synchronizing indicator is received by training sequence generator 20, and causes successive training signals to be read out of an internal memory device.

The errors between the undistorted, delayed undistorted, and channel distorted forms of successive training signals are employed to converge equalizer 10, as hereinafter described in greater detail, to an auto regressive moving average model of a transmission channel which is inverse to channel 14. At the conclusion of the training sequence the output of equalizer 10, $y(n)$ is equal to the data provided by generator 12, to within a prespecified residual error. $y(n)$ is coupled to a threshold comparator device 24, which is structured to recognize a value of $y(n)$ which is equal to one of the aforementioned PAM amplitude levels, plus a possible residual error. The output $\hat{y}(n)$ of threshold comparator 24 is recognized PAM amplitude levels, with the residual error removed.

After equalizer 10 has been initially converted by a training signal, selector switch 22 couples threshold comparator output $\hat{y}(n)$ to equalizer input $\bar{a}(n)$. Thereafter, the equalizer is reconverged, to adapt to changing channel characteristics, by the relation between successive y(n) outputs and X(n) inputs. Typically another training signal sequence need not be coupled through the channel to reconverge equalizer 10, and as a consequence, there is no need to interrupt the flow of real data through channel 14 after initial convergence. Because threshold output ŷ(n) is used as input $\bar{a}(n)$ after training equalizer 10 and feedback as $\bar{a}(n-1)$, it is referred to as a decision feedback equalizer.

Figure 2:
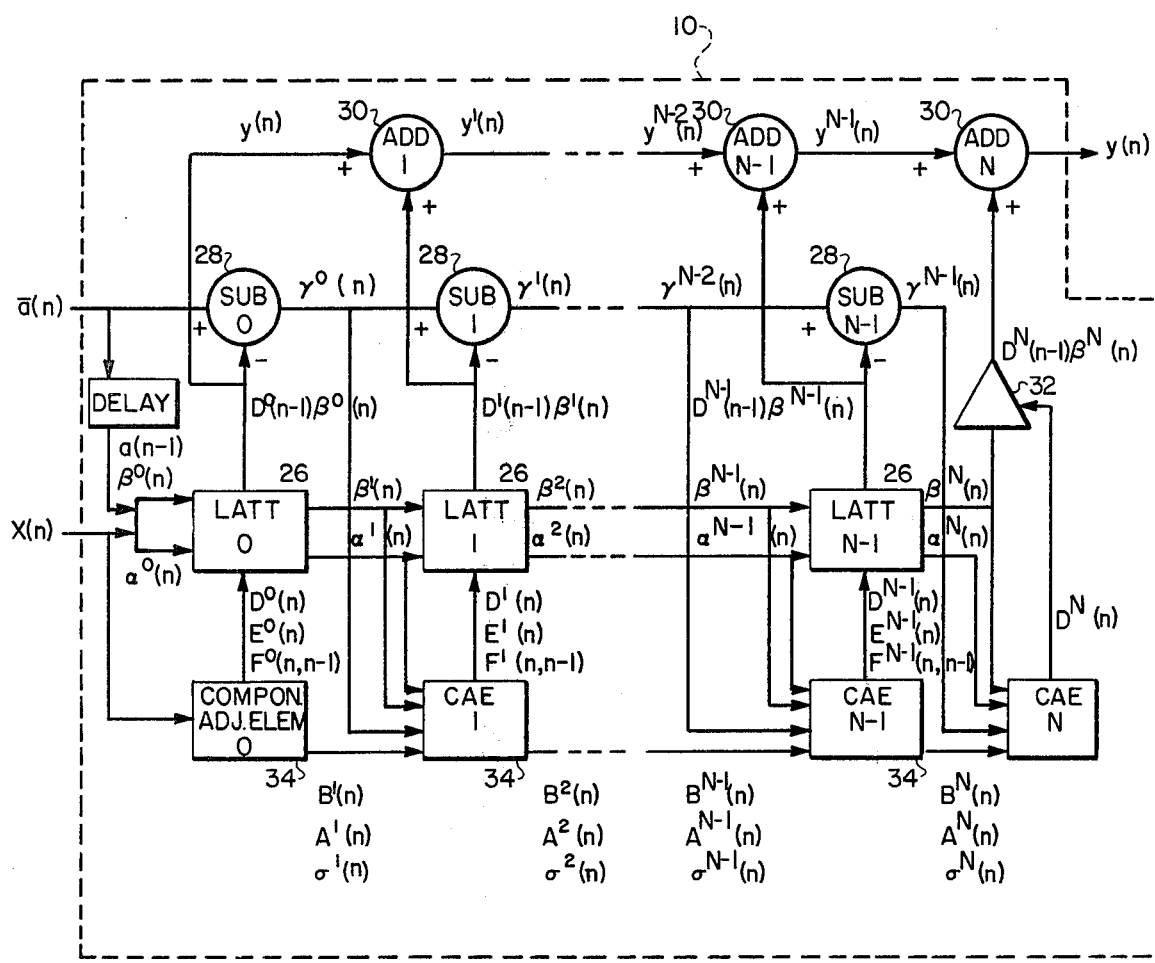
FIG. 2 is a partially detailed schematic diagram of the improved equalizer.

Referring to FIG. 2, equalizer 10 is provided with N lattice stages 26 successively coupled in a cascade relationship. N is the order of equalizer 10 and is usually between 5 and 21 stages. Lattice stage N−1 provides vector outputs $\beta^N(n)$ and $\alpha^N(n)$ and the inputs are $\beta^{N-1}(n)$ and $\alpha^{N-1}(n)$. The inputs to lattice stage 0, $\beta^0(n)$ and $\alpha^0(n)$ are vectors composed of the equalizer input X(n) and the delayed $\bar{a}(n-1)$.

In addition to $\beta^{P+1}(n)$ and $\alpha^{P+1}(n)$, the Pth lattice stage generates an output $D^P(n-1)B^P(n)$, which is coupled to a subtraction or subtractor element 28, as an input thereto, elements 28 being respectively referenced in FIG. 2 as subtractors O to N−1. $D^P(n-1)$ is a matrix which comprises the gain for the output of the Pth lattice stage. Subtractor elements 28 are coupled in a succession, so that for P=1, 2 . . . N−2, the output of subtractor P, $\gamma^P(n)$, comprises a second input to subtractor P+1. $\gamma^P(n)$ is an error quantity which indicates the difference between subtractor inputs $\gamma^{P-1}(n)$ and $D^P(n-1)\beta^P(n)$. For subtractor O, the second input comprises equalizer input $\bar{a}(n)$, the output being $\gamma^0(n) = \bar{a}(n) - D^0(n-1)\beta^0(n)$.

In addition to providing inputs to subtractor 28, the lattice stage outputs $D^P(n-1)\beta^P(n)$ provide inputs to adder elements 30, which are shown in FIG. 2 to be connected in a succession, and to be respectively referenced as adders O to N−1. An additional adder 30, referenced as adder N, also is shown receiving the quantity $D^N(n-1)\beta^N(n)$ from an amplification element 32. From the interconnections of adders 30, it is clear that the output of adder N comprises $$\sum_{P=0}^{N} D^P(n-1)\beta^P(n),$$

which is the equalizer output Y(n).

A series of component adjust elements 34 are connected in a cascade relationship and referenced in FIG. 2 as component adjust elements O to N−1. The input to component adjust element O is a vector whose components are X(n) and $\bar{a}(n-1)$, and for P=1, 2 . . . N−1, inputs to the Pth adjust element comprise $\beta^P(n)$, $\alpha^P(n)$, and $\gamma^P(n)$, and the scalar quantities $B^P(n)$, $A^P(n)$ and $\sigma^P(n)$. For P=0, 1 . . . N−1, the outputs of the Pth adjust element are quantities $B^P(n)$, $A^P(n)$ and $\sigma^P(n)$, and also matrices $D^P(n)$, $E^P(n)$ and $F^P(n, n-1)$. $D^P(n)$ is the matrix gain of the Pth lattice stage 26. $E^P(n)$ and $F^P(n, n-1)$ are the matrix multipliers contained in N lattice stages described below.

Component adjust elements 34 are digital computational devices respectively operated to converge equalizer 10 by iteratively calculating the matrices of $D^P(n)$, $E^P(n)$ and $F^P(n, n-1)$, in accordance with the classical least squares problem. That is, when the nth equalizer inputs, or data samples, X(n) and $\bar{a}(n)$ and $\bar{a}(n-1)$ are received by the first lattice stage of the equalizer, component adjust elements compute values for matrices $D^P(n)$, $E^P(n)$ and $F^P(n, n-1)$, for P=0, 1 . . . N−1. The matrices are then cooperatively used to minimize an accumulation of the squared errors between actual and desired equalizer outputs. From the interconnections of respective components of the equalizer shown in FIG. 2, it may be seen that the accumulation of errors when the nth data samples X(n) and $\bar{a}(n)$ are received is $\gamma^P(n)$, where $$\gamma^{N-1}(n) = \bar{a}(n) - \sum_{P=0}^{N-1} D^P(n-1)\beta^P(n) \quad (1)$$

During the time between the nth and n+1st data samples, the Pth component adjust element computes and couples to the Pth lattice stage the coefficients $D^P(n)$, $E^P(n)$, and $F^P(n, n-1)$. However, from Equation 1, it is seen that the error accumulation up to such time is determined in part by the coefficients $D^P(n-1)$. Also, as elaborated on below, each quantity $\beta^P(n)$ for Equation 1 is derived from coefficients $E^P(n-1)$ and $F^P(n-1, n-2)$.

The component adjust elements each compute coefficients $D^P(n)$, $E^P(n)$ and $F^P(n, n-1)$ during the time between the nth and n+1st input samples, in accordance with a least squares lattice auto regressive moving average model. They each generate matrix quantities $A^{P+1}(n)$, $B^{P+1}(n)$ and scalar quantity $\sigma^P(n)$ and couple them to adjust element P+1. Such quantities are required by adjust element m+1 in determining coefficients $D^{P+1}$, $E^{P+1}$, and $F^{P+1}$. Adjust element P also calculates and stores quantities $K^P(n)$ and $K^P_\gamma(n)$, for use in determining coefficients $D^P(n+1)$, $E^P(n+1)$ and $F^P(n+1, n)$.

From the Least Squares Lattice Decision Feedback Equalizer algorithm (LLDFE) the various quantities are calculated by the Pth component adjust element during the time between the nth and n+1th data samples. These quantities have the following relationships for P=1, . . . N−1:

$$\sigma^P(n) = \sigma^{P-1}(n) + [[B^P(n)]^{-1}\beta^P(n)]^+ \beta^P(n) \quad (2)$$

$$K^P(n) = wK^P(n-1) + \frac{\alpha^P(n) \otimes \beta^P(n-1)}{1 - \sigma^{P-1}(n-1)} \quad (3)$$

$$D^P(n) = ([B^P(n-1)]^{-1}k_\gamma^P(n))^+ \quad (4)$$

$$E^P(n) = K^P(n) + [A^P(n)]^{-1} \quad (5)$$

$$F^P(n, n-1) = K^P(n)[B^P(n-1)]^{-1} \quad (6)$$

$$A^{P+1}(n) = A^P(n) - K^P(n)[B^P(n-1)]^{-1}K^P(n)^+ \quad (7)$$

$$B^{P+1}(n) = B^P(n-1) - K^P(n)^+[A^P(n)]^{-1}K^P(n) \quad (8)$$

$$k_\gamma^{P+1}(n) = wk_\gamma^{P+1}(n-1) + \gamma^P(T)\beta^{P+1}(T) \quad (9)$$

For P=0, the following relationships are specified:

$$A^0(n) = B^0(n) = wB^0(n-1) + \begin{pmatrix} x^2(n) & x(n)\bar{a}(n-1) \\ x(n)\bar{a}(n-1) & \bar{a}^2(n-1) \end{pmatrix} \quad (10)$$

$$\sigma^{-1}(n) = \sigma^{-1}(n-1) = 0 \quad (11)$$

$$k_\gamma^0(n) = wk_\gamma^0(n-1) + \bar{a}(n)\beta^0(n) \quad (12)$$

Prior to n=0, i.e., before the first data samples X(n) $\bar{a}(n-1)$ and $\bar{a}(n)$ are received, the following initial conditions exist:

$$\alpha^P(-1) = \beta^P(-1) = k_\gamma^P(-1) = (0, 0)^+ \quad (13)$$

$$A^P(-1) = B^P(-1) = \begin{pmatrix} \delta & 0 \\ 0 & \delta \end{pmatrix} \quad (14)$$

$$K^P(-1) = \begin{pmatrix} 0 & 0 \\ 0 & 0 \end{pmatrix} \quad (15)$$

$$\sigma^P(-1) = 0 \quad (16)$$

In the above equations:

$N = \max(Q - 1, R) = $ number of stages $m = \min(Q - 1, R) = $ last 2-dimensional stage $$\alpha^P(n), \beta^P(n) = \begin{cases} 2 \text{ dimensional vectors for } p \leq m \\ 1 \text{ dimensional vectors for } p > m \end{cases}$$

$A^P(n), B^P(n), K^P(n), E^P(n), F^P(n, n-1)$ $$= \begin{cases} 2 \times 2 \text{ matrices for } p \leq m \\ 1 \times 1 \text{ matrices for } p > m \end{cases}$$

$$D^P(n), k_\gamma^P(n) = \begin{cases} 1 \times 2 \text{ matrices for } p \leq m \\ 1 \times 1 \text{ matrices for } p > m \end{cases}$$

$\sigma^P(n) = $ scalar; $^+ = $ matrix transpose $\otimes = $ tensor product; for example $(\alpha \otimes \beta)_{ij} = \alpha_i \beta_j$ If at a particular stage the dimension of a matrix and/or vector decreases (i.e., $p = m+1$), they are obtained by projecting on the subspace of the first component. If desired this may be achieved by retaining dimension and inserting zero matrix elements where appropriate. Also, $\delta$ is a small positive constant, and W is a weighting factor which is selected to ensure that in the accumulation of squared errors, the most recent errors are given the greatest significance.

The exact makeup of the component adjust elements is not set out to avoid belaboring the obvious. The state-of-the-art is rich with a wide variety of digital devices that are routinely selected for performing arithmetic functions and computations. These include adders, shift registers, data selection devices, and programmable read-only memories (PROM's) suitably to perform as predicted by equations such as those set out above as Equations 2-13. Specific digital arrangements for use in an adjust element, interconnected as described that calculate matrices $D^P(n)$, $E^P(n)$, and $F^P(n,n-1)$ are well known and may be selected by those of skill in the art to which this invention pertains. For example, a PROM device may be included in adjust element P which is selectively programmed to direct a sequence of arithmetic computation, data storage, and data retrieval operations to calculate the various quantities of Equations 2-13. Some of the calculations are stage recursive, that is, they require input data from a previous adjust element, comparator or lattice stage. Some of the calculations are time recursive, that is, they require input data which is derived from previous equalizer input samples.

A component adjust element N is similar or identical to adjust elements 1 through $N-1$, and receives the same input quantities. However, the only output provided by component adjust element N is coefficient $D^N(n)$ and the matrix gain of amplification element 32 during the following sampling time.

From Equations 2-16 it will be seen that in order to determine matrices $D^P(n)$, $E^P(n)$ and $F^P(n,n-b)$, the component adjust element P must receive inputs $\beta^P(n)$ and $\alpha^P(n)$. These quantities are obtained according to the LLDFE algorithm, from the following:

$$\beta^{P+1}(n) = \beta^P(n-1) - E^P(n-1)\alpha^P(n) \quad (17)$$

$$\alpha^{P+1}(n) = \alpha^P(n) - F-(n-1, n-2)\beta^P(n-1) \quad (18)$$

Since $\alpha^O(n)$ and $\beta^O(n)$ are both vectors equal to $$\begin{pmatrix} X(n) \\ \bar{a}(n-1) \end{pmatrix},$$

each the remaining vectors $\beta^P(n)$ and $\alpha^P(n)$ can be found from Equations 17 and 18. To minimize convergence time, the equations are implemented physically, rather than be solved through mathematical computations.

Figure 3:
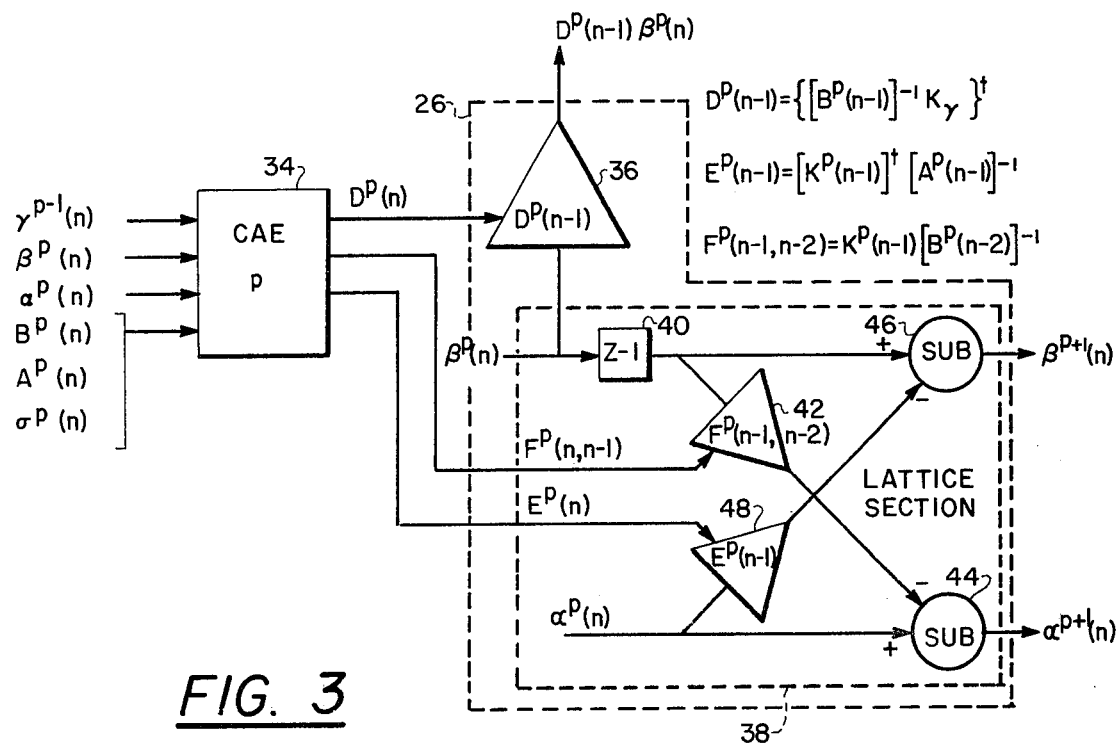
FIG. 3 depicts a schematic diagram embracing the improvements to a lattice stage set forth in FIG. 2.

This physical implementation is given a typical form in the Pth lattice stage 26, as shown by FIG. 3. The lattice stage has a matrix multiplier or amplification element 36 coupled to receive input $E^P(n)$, and a lattice section 38, which receives both inputs $E^P(n)$ and $\alpha^P(n)$. When $X(n)$, $\bar{a}(n-1)$ and $\bar{a}(n)$ are received, that is, at the beginning of the time between the nth and n+1st data samples, a $1 \times 2$ matrix gain modified by amplification element 36 is $D^P(n-1)$ and is a function of the period between samples $n-1$ and n. By the time that data samples $n+1$ are received by equalizer 10 it has generated the matrix $D^P(n)$, and set the matrix gain of amplification element 36 of the Pth stage.

Looking once again to FIG. 3, lattice section 38 includes a delay element 40 which receives the vector signal $\beta^P(n)$, delays it by one sampling time and passes the delayed signal to a subtractor or subtracting element 46. The output of delay element 40 is also coupled, through a two-dimensional matrix multiplier 42 which has its output fed to a subtractor 44. After the matrix multiplier 48 is set to equal $E^P(n-1)$, by the component adjust element P during the previous sampling time, the signal $\beta^P(n-1)$ is received by subtractor 46 along with $E^P(n-1)\alpha^P(n-1)$, and the subtractor creates the value of $\beta^{P+1}(n)$, see Equation 17.

In like manner, inputs $\alpha^P(n)$ and $F^P(n-1, n-2)\beta^P(n-1)$ are fed to subtractor 44 via the matrix multiplier 44. The matrix multiplier thereof being $F^P(n-1, n-2)$, which is calculated. The adjust elements P determine the matrix multiplier during previous sampling times to be $F^P(n-1, n-2)$. The subtractor's output has a value of $\alpha^{P+1}(n)$ which predicted by Equation 18.

When all of the lattice stages O to $N-1$ are joined together as shown in FIG. 2, the lattice sections 38 form a lattice which rapidly generates each of the quantities $\beta^P(n)$ and $\alpha^P(n)$, each time the nth data sample is received by equalizer 10. Since $\beta^P(n)$ and $\alpha^P(n)$ are generated by physical operation of respective lattice sections rather than by mathematical calculations on the entire set of past data, the number of calculations which otherwise must be performed for equalization is significantly reduced. Equalizer 10 therefore provides enhanced operational efficiency, and also enables convergence times to become very short.

The series of operations of the component adjust elements and lattice sections in providing coefficients $D^P(n)$, $E^P(n)$ and $F^P(n, n-1)$, in response to the nth data samples, is referred to as an iteration. During equalizer convergence, successive iterations of equalizer 10 cause an error term $\gamma^{N-1}(n)$ to be steadily diminished to within a prespecified limit. The error term is determined in part by the order N of equalizer 10 with the error term decreasing as N increases.

Figure 4:
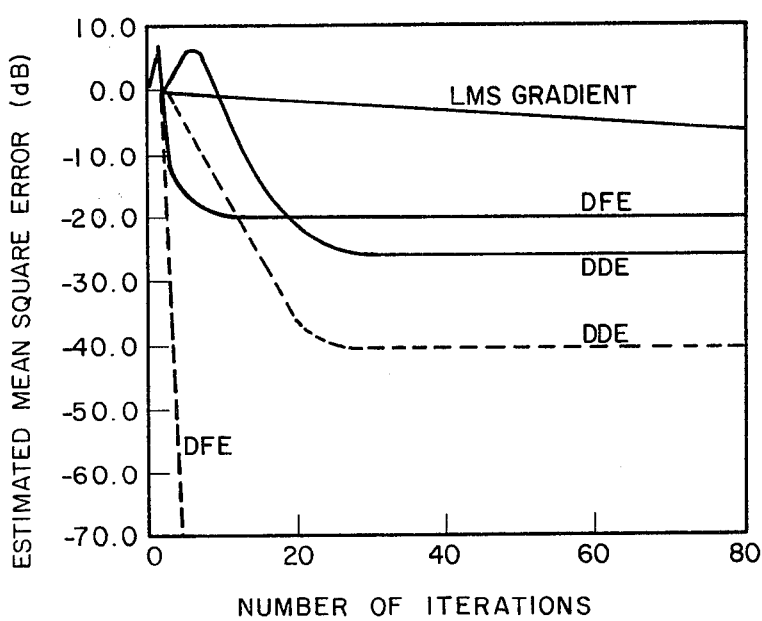
FIG. 4 is a comparison of the start-up for the LSM gradient, Decision Directed Equalizer DDE(M=10), and Decision Feedback Equalizer DFE(Q=2, R=0). The solid lines indicate SNR=30 dB, and for the dashed lines SNR=$\infty$ (For all lines W=0.995).
Figure 5A:
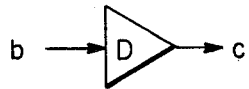
FIGS. 5a, b and c are graphical representations of the matrices of the lattice stages.
Figure 5B:
Figure 5C:
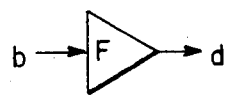

Referring to FIG. 4, data illustrates a comparison of the numbers of iterations needed by a lattice decision feedback equalizer (DFE) and a lattice decision directed equalizer (DDE) to reduce their respective error terms to a somewhat acceptable level. The DFE channel had only two zeros with Q=2 and R=0. The least mean squares (LMS) algorithm and ten stage DDE are used for comparison. The different lines are for different signal-to-noise ratios (SNR), see drawing description above.

The disclosed equalizer 10 may very usefully be fabricated by incorporating each lattice stage P and component adjust element P in one discrete integrated circuit chip. An equalizer of any desired order readily could be constructed simply by selecting and consecutively joining the desired number of chips. The entire equalizer may be formed upon a single integrated circuit chip with some of the computational devices required for component adjust elements 32 being shared in common amongst them. In another modification of the invention some or all of the calculations required to converge the equalizer may be performed by a digital computer device, programmed in accordance with Equations 2–18.

Obviously many modifications and variations of the present invention are possible in the light of the above teachings. It is therefore to be understood that within the scope of the appended claims the invention may be practiced otherwise than as specifically described.

What is claimed is:

1. An improved apparatus for equalizing signals and coupled to a data transmission channel comprising:
   a plurality of successively coupled least squares lattice stages, the first of which is coupled to receive the output from the channel and each having a selected configuration of adjustable electrical components;
   means for generating sequences of transmitted training signals for transmission therethrough;
   means for generating sequences of undistorted training signals being substantially the same as the transmitted training signals;
   error generating means coupled to each of the least squares lattice stages and to the undistorted training signal generating means for providing a succession of error terms, each being an accumulation of error quantities, representing the difference between the undistorted training signals, received by said error generating means, and the transmitted training signal after it has traveled through the data transmission channel and been received by the first one of the least squares lattice stages; and
   a component adjust means coupled in each least squares lattice stage and the preceding error generating means for iteratively adjusting the electrical components of its least squares lattice stage in accordance with an auto regressive moving average model of the transmission channel procedure, the interconnected preceding error generating means providing an error term which is within a prespecified limit when the electrical components are iteratively adjusted in response to the final training signal in the sequence.

2. The apparatus of claim 1 in which each of the least squares lattice stages includes:
   a one-by-two matrix for amplifying an input by a first multiplier coefficient; and a least squares lattice section having a first two-dimensional matrix and a second two-dimensional matrix.

3. The apparatus of claim 2 in which each component adjust means has a number of component adjust elements, each coupled to a corresponding least squares lattice section and the component adjust elements of a least squares lattice stage has means for performing a series of operations in accordance with an auto regressive moving average model of the channel procedure in response to one of the training signals to generate multiplier coefficients respective ones of the one-by-two dimensional matrix, and the first and second two-dimensional matrices of a given least squares lattice stage.

4. The apparatus of claim 3 in which said error generating means has a succession of error generating elements each provided with first and second error element inputs and an error element output equal to one of said error quantities so that the successive outputs of the final error generating element of the succession of error elements is the succession of error terms.

5. The apparatus of claim 4 wherein the equalizer apparatus is coupled to receive digital form data samples at selected intervals from a data source, and each of the least squares lattice stages is provided with first and second least squares lattice stage inputs and first and second least squares lattice stage outputs, the first and second least squares lattice stage inputs are coupled to receive the outputs of the preceding least squares lattice stage and the first and second least squares lattice stage outputs are coupled as inputs of the following least squares lattice stage; and each of said component adjust elements has means for determining multiplier coefficients for the one-by-two matrix and the first and second two-dimensional matrices of its corresponding least squares lattice stage during each of the selected intervals in accordance with previously received data samples.

6. The apparatus of claim 4 further including:
   a succession of adder elements, each of said adder elements having an input coupled to receive the output of the preceding error generating element except for the output of the final adder element in said succession of adder elements which is the output of the equalizer apparatus; and
   a selector switch connected to the training signal generating means, to the output of the equalizer apparatus and to the error generating means for coupling equalizer apparatus output to the input of the error generating means at the conclusion of a training signal sequence.

7. The apparatus of claim 6 each of the least squares lattice sections includes a delay element receiving a first least squares lattice stage input for delaying said first least squares lattice stage input by an amount of time equal to the interval between two successive training signals in said sequence of training signals, a first least squares lattice section subtractor element coupled to receive the output of said delay element, a first two-dimensional matrix of a least squares lattice section, being coupled to provide an input for the next least squares lattice stage and coupled to connect its output to a first least squares lattice section subtractor element causing the output of said first least squares lattice section subtractor element to be the difference between its inputs;
- a second least squares lattice section subtractor element coupled to receive the same input as the second two-dimensional matrix; and
- the first two-dimensional matrix of the least squares lattice section being coupled to receive the output of the delay element and coupled to connect its output and the second least squares lattice section subtractor element causing the output of said second least squares lattice subtractor element to be the difference between the outputs to the second least squares lattice section subtractor element.

8. The apparatus of claim 7 in which the data is transmitted in analog form through the data transmission channel and is coupled through an analog-to-digital converter to first and second inputs of the first least squares lattice stage of said successively coupled least squares lattice stages and the component adjust element for least squares lattice stage has a device for controllably processing, storing and outputting data in digital form to iteratively generate the multiplier coefficients for the one-by-two dimensional matrix and the first and second two-dimensional matrices of a least squares lattice stage.

9. The apparatus of claim 6 in which the data is in pulse modulated form through the data transmission channel and further includes:
- threshold comparator means coupled between the output of the equalizer apparatus and the selector switch for responding to one of said equalizer outputs by generating one of a plurality of discrete signal levels employed in the pulse modulation.

* * * * *